Figure 1:
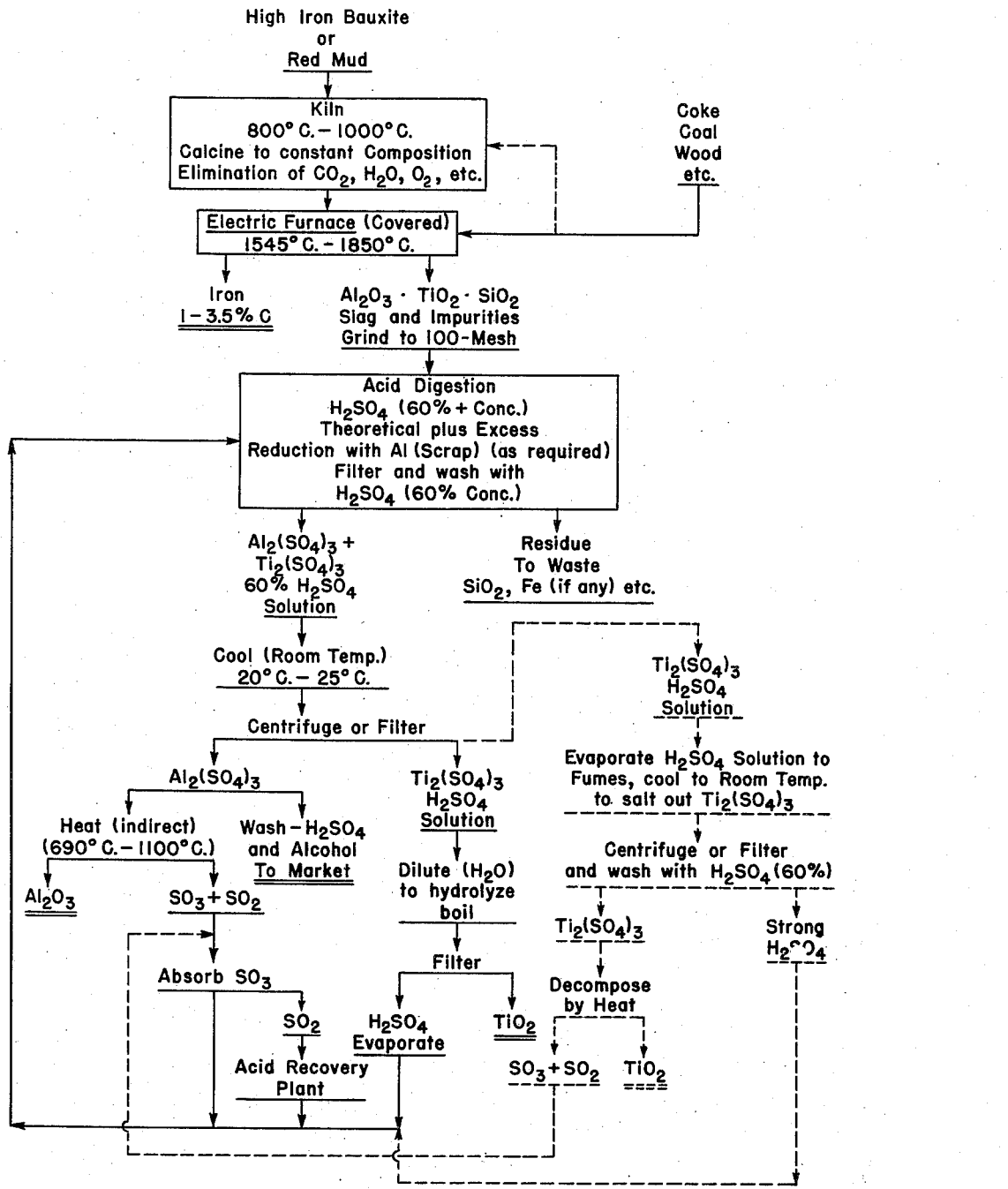

Fig. I.

April 15, 1958 M. J. UDY 2,830,892
PROCESS FOR THE SEPARATION AND RECOVERY OF
Fe, Ti AND Al VALUES FROM ORES AND
WASTE MATERIAL CONTAINING SAME
Filed Dec. 16, 1955 3 Sheets-Sheet 3

INVENTOR
Marvin J. Udy
BY
Charles J. Elderkin
ATTORNEY (# 2,830,892)

United States Patent Office

2,830,892
Patented Apr. 15, 1958

2,830,892

PROCESS FOR THE SEPARATION AND RECOVERY OF Fe, Ti, and Al VALUES FROM ORES AND WASTE MATERIALS CONTAINING SAME

Marvin J. Udy, Niagara Falls, N. Y., assignor to Strategic-Udy Metallurgical & Chemical Processes Limited, Hamilton, Ontario, Canada, a corporation of Ontario, Canada Application December 16, 1955, Serial No. 553,529

21 Claims. (Cl. 75—30)

This invention relates to metallurgy and has for an object the provision of improved methods or processes for the production and recovery of iron, alumina, and titania. More particularly, the invention contemplates the provision of improved methods or processes for the production and recovery of metallic iron and titanium oxides from titanic iron ores such as ilmenite, and high-titanium-alumina clays, and for the production and recovery of metallic iron, alumina, and titanium oxides from relatively low-grade alumina-titaniferous ores such as high-iron bauxite ores, and waste residues of the type resulting from conventional treatment of high-grade bauxite ores in the production of alumina, such, for example, as the red mud residual product of the Bayer alumina process.

In treating relatively high-grade bauxite ores for the recovery of alumina by the Bayer process, finely-divided, calcined bauxite is mixed with a heated, aqueous solution of sodium hydroxide for the formation of sodium aluminate with subsequent precipitation of aluminum hydroxide from the sodium aluminate, followed by calcination of the aluminum hydroxide to alumina. Impurities present in the original ore including ferric oxide and titania are unaffected by the sodium hydroxide leaching operation, as is the greater part of the silica content of the ore which forms insoluble calcium silicate in the presence of lime added to the original charge. Approximately eighty-five to ninety percent (85–90%) of the alumina content of the bauxite is dissolved by the digesting treatment, and, thereafter, the mother liquor including the residue of impurities, is subjected to a settling treatment so as to effect separation of the solid impurities; the sodium-aluminate liquor being subjected to a precipitation treatment for the recovery of aluminum hydroxide which is filtered to yield a product suitable for calcination to alumina. The settled residue recovered from the settling tanks, containing ferric oxide, silica, titania and minor amounts of other impurities, as well as undissolved alumina, is known as "red mud" and is largely discarded by pumping into tailings deposits or ponds. Although attempts have been made to rework residual red mud through use of the lime-soda sintering process described hereinafter, as a source of additional alumina and titanium oxide from low-grade bauxite ores following application of the Bayer process to such ores, for the most part, such a combined process has met with only limited commercial success as a war time expedient, and the residual red mud is viewed as a necessary waste product of most commercial alumina installations, with present emphasis being directed towards improving the overall efficiency of the Bayer process to reduce the amount of alumina passed off within the waste residues.

As in the red mud residues from the Bayer process, the system, $Al_2O_3$—$SiO_2$—$Fe_2O_3$—$TiO_2$, is also presented in relatively low-grade natural bauxite ores of high iron contents. The principal processes proposed heretofore for the treatment of high-iron bauxites in the production and recovery of alumina are the so-called "lime-soda sintering process" or Déville-Pechiney process, and the so-called "electric furnace fusion process" or Pedersen process. In the lime-soda sintering process, the high-iron bauxite ore is mixed with limestone and soda ash and calcined to form a sintered mass which is then leached with hot water for the extraction of soluble alumina (sodium alumiate). The solution is then treated in an autoclave at a temperature of about 160° C. and under pressure, whereby the greater part of the silica content forms insoluble sodium-aluminum silicate. After suitable settling and filtering, the solution is treated with carbon dioxide to precipitate aluminum hydroxide which is then treated by calcining as in the Bayer process for the production of alumina. Here again, the silica, ferric oxide, and titania, being insoluble, as well as undissolved portions of the alumina, are left in a residual waste product (red mud) of the process. In spite of much research and development work conducted towards improving the lime-soda sintering process, it has met with little commercial success in recent years except for limited applications such as in the treatment of low-silica bauxites, but inasmuch as these ores are also desirable raw materials in the Bayer process, the relatively high soda losses encountered in the former process render it non-competitive with the Bayer process.

The Pedersen fusion process for the production of alumina from high-iron bauxites involves smelting the ore together with coke and relatively large amounts of limestone in an electric furnace, whereby the alumina content of the ore is passed into the slag produced during the smelting operation in the form of an aluminate of lime while the iron compounds of the bauxite are recovered from the furnace in the form of low-sulphur pig iron. The slag is then treated with sodium carbonate solution to form insoluble calcium carbonate and a sodium aluminate solution from which alumina may be precipitated, and, like the other processes described hereinbefore, an insoluble mud is formed containing silica, titania and portions of the alumina present in the original ore. While the Pedersen process has met with some commercial success in Norway, it is inherently restricted to use in conjunction with relatively low-silica bauxite ores, in that, it has been demonstrated that the only practical furnace technique for the production of calcium aluminate from medium or high-silica bauxites requires a two-stage reduction operation in which silica and iron oxide are reduced to ferrosilicon and removed in a first stage, with the addition of lime and the formation of calcium aluminate being effected in a second stage by treatment of molten alumina slag recovered from the first stage. Furthermore, it is not possible in the Pedersen process to effect the reduction within the smelting stage of titanium dioxide values present in the bauxite ores to lower oxide forms of titanium, as may be practiced quite readily with the acid slags produced in accordance with a process of the present invention as described hereinafter, but rather, in the Pedersen process the titanium values are simply passed to waste as titanium dioxide within the waste residue of the process in much the same manner as the Bayer process.

The process of the present invention is based in part on my discovery that the iron oxide content of high-iron bauxite ores, waste residues from the Bayer process, ores of the type of ilmenite and high-titanium-alumina clays, and high-alumina slags resulting from aluminothermic reduction of ilmenite and rutile ores, can be selectively reduced directly in an electric furnace operation with the production and recovery of a commercial iron product, and without the addition of large amounts of calcium oxide or limestone as required in the Pedersen process, by utilizing the alumina content of the bauxite or waste residue as a base with respect to silica present in the charge or added thereto as required, as for example, when treating ilmenite or high-titanium-alumina clays, and that the acid slag remaining after reduction of the iron oxide may be readily decomposed by acid leaching with the production and recovery of alumina and titanium oxides as separate, valuable commercial products. Thus, I have found that complete or total reduction and removal of iron in the form of metallic iron containing from one percent to three and one-half percent (1.0–3.5%) carbon can be had from slags of the composition $Al_2O_3 \cdot SiO_2$ (sillimanite) or $3Al_2O_3 \cdot 2SiO_2$ (mullite) at temperatures within the range 1545° C.–1850° C., and that reduction of titanium dioxide ($TiO_2$) present in the original ores or waste residues to lower oxides of titanium, such as $Ti_2O_3$ or even $TiO$, may be effected to a substantial extent in the electric furnace smelting operation since the slags produced, containing silica and alumina, will hold considerable amounts of such lower oxides in solution without becoming too refractory. In the direct smelting of ilmenite ores ($FeTiO_3$) as practiced heretofore, provided total reduction of iron is attempted, the resulting slag will consist largely of titanium dioxide and lower oxides of titanium and will be so refractory that it cannot be tapped from the furnace at reasonable temperatures. In accordance with a process of my invention, while the presence of silica and alumina in ilmenite reduction slags permits the retention of considerable amounts of lower oxides of titanium within the slags, thereby making it possible to practice total reduction of iron without rendering the slag overly refractory, I may also operate the smelting stage when treating ores of this type to selectively reduce and remove any portion of the iron oxide, leaving unreduced iron oxide and the titania, in the form of titanium dioxide, within the slag with reduction and removal of the residual iron being effected during the acid decomposition of the slag. That is to say, I may operate the electric furnace for the production of slags of substantially the composition $Al_2O_3 \cdot TiO_2 \cdot SiO_2$, in which the major portion of the titanium oxide content of the ore or residue is not reduced but remains in the dioxide form, since I have found that it is not essential in a process of my invention to practice complete or total reduction of the iron oxide by reason of the fact that in the subsequent acid decomposition treatment of the slag recovered from the electric furnace for the production of aluminum sulfate $[Al_2(SO_4)_3]$ and titanium sulfate $[Ti_2(SO_4)_3]$, as described more fully hereinafter, aluminum scrap metal which is used to effect reduction of oxytrisulfate of titanium $[Ti_2O(SO_4)_3]$ formed during the acid decomposition to $Ti_2(SO_4)_3$, will also effect reduction to the metallic state of any unreduced iron oxide remaining in the slag after smelting, which then leaves the system within the silica residue. Of course, if excess carbon is employed during smelting of a high-iron bauxite ore or red mud residue for the total reduction and removal of iron with resulting reduction of the titanium dioxide content of the ore or residue to lower oxide forms, titanium sulfate, in the form $Ti_2(SO_4)_3$, will be formed directly during acid decomposition of the resulting slag and I need not employ aluminum scrap metal in the decomposition stage as required for reduction of the sulfate $Ti_2O(SO_4)_3$ formed upon decomposition of slags in which the titania is carried largely in the form of titanium dioxide. In any event, unlike most acid alumina processes proposed heretofore, in the process of the present invention iron entering the alumina system by choice or by so-called mechanical contamination will not prevent complete separation and recovery of the aluminum values, but rather, iron going into solution is simply reduced with scrap aluminum and will be carried out of the system as a component of the waste silica residue. Furthermore, in direct contrast to the Bayer process and the other alkaline alumina processes described hereinbefore wherein silica is attacked by the alkaline reagents with the result that its elimination is often troublesome and at the best incomplete, involving losses of alkali as well as alumina, the acid process of the present invention does not result in dissolution of silica nor losses of acid or alumina in an analogous manner to the losses characteristic of the alkaline processes.

The high efficiency of the process of the invention is also based in part on the use in the smelting stage of the process of the unique smelting technique and electric furnace design described and claimed in my copending application Serial No. 553,645, filed of even date herewith and entitled "Electric Furnace and Process of Operating the Same." That is to say, in conventional electric furnace smelting, the furnaces are designed and operated as submerged arc furnaces, in that, the actual arcing tips of the furnace electrodes are submerged with respect to the charge distances ranging from four (4) to ten (10) feet. In this type of smelting, segregation of the reducing agent and fines in the charge takes place quite readily with the result that the reducing agent collects under the electrodes and raises the electrodes at any given voltage, thereby lengthening the arcs with the development of very high localized temperature zones, causing over-reduction and volatilization of charge components and unpredictable or inefficient operation as a whole. Furthermore, it is virtually impossible to employ fine ores to any extent in such smelting operations, but rather, the ores must be carefully classified to insure delivery to the furnace of a lump-type charge containing on an average of not more than twenty-percent (20%) of minus twenty (—20) mesh particle size ores, in order to prevent excessive dust losses by reason of fines being carried out of the furnace chamber under action of pressurized gases produced adjacent the electrode tips beneath the relatively deep bed or cover of raw charge which surrounds the electrodes.

The furnace design and smelting technique of my aforementioned copending application are based on the discovery that operation of an arc electric furnace with the electrode tips carried on the surface of a molten slag bath within the furnace, or, with a maximum of one-half inch (½") arcs extending to the surface of the slag bath to a limited submergence of the arcing tips to a depth of three inches (3") within the slag bath such as to avoid wetting of the electrodes, not only prevents segregation of the charge components but permits much more power to be supplied to the furnace at lower operating voltages, and the smelting temperatures can be held constant within very close tolerances. Furthermore, the charge can be of much finer particle sizes, and, in fact, concentrates are preferable, and still there are practically no dust losses since the avoidance of deep columns of raw charge material adjacent the electrodes effectively eliminates high-pressure zones of the type developed in prior conventional smelting operations. As described in my copending application, the preferred furnace design employed in practicing the foregoing smelting technique is largely determined by the principles applied, in that, the width of the furnace chamber is controlled such as to avoid adherence of slag to the walls of the furnace and the height of the chamber is a function of the desired angle of repose of charge material within the furnace, such as to avoid submergence of the arcing tips within raw charge material. In practice, I have found that an angle of repose of charge material of about forty-five degrees (45°) is quite effective for most purposes with the charge being fed down the banks or side walls of the furnace in such manner that the natural angle of repose of the material being smelted will just reach the center of the furnace with the raw charge resting or floating upon the molten slag bath, while depressing the peripheral portions of the slag bath to avoid adherence of slag to the furnace walls. Smelting takes place under the raw charge and within the first six (6) to eight (8) inches of charge material floating on the slag and produces but a minimum amount of heat losses by radiation to the roof of the furnace. For the most part, the reaction zone of the furnace is controlled through control of the rate of feed of raw charge to provide for the maintenance of a substantially constant-depth slag bath thereby insuring a substantially constant-resistance current path, and the overall effect is the establishment of combined arc-resistance, slag-resistance heating with the transfer of heat taking place from the slag to the smelting charge in lieu of the conventional arc-coke resistance heating which characteristically occurs in prior submerged arc smelting operations. Furthermore, segregation of coke is completely eliminated since the electrodes are maintained clear of the reducing charge.

In accordance with the process of the present invention, I apply the foregoing electric furnace techniques of my copending application to high-iron bauxites, ilmenite ores, high-titanium-alumina clays, high-alumina slags resulting from aluminum reduction of ilmenite or rutile ores, or waste residues such as the red mud residue of the Bayer alumina process, by smelting a calcined, substantially constant composition charge of such material in the presence of a controlled amount of carbonaceous reducing agent to effect the selective reduction to the metallic state of all or any desired lesser amount of the iron oxide present in the charge material, with the production and recovery of metallic iron of controlled carbon content and a residual silica slag containing substantially all of the titania of the original material in the form of titanium dioxide or lower oxides of titanium, as well as substantially all of the alumina of the original material. I then subject the slag recovered from the smelting stage in finely-divided form to a unique strong (or weak) sulfuric acid digestion treatment at elevated temperatures, effecting the simultaneous reduction in solution by means of scrap aluminum, as required, of any complex sulfate salts of titanium formed during the acid digestion as well as any iron oxide carried in the slag recovered from the smelting stage, to produce a solution of titanium and aluminum sulfates and a waste residue consisting of silica and impurities present in the system including any metallic iron resulting from reduction of iron oxide not removed during the initial smelting operation or present by reason of mechanical contamination. The resulting solution of aluminum sulfate and titanium sulfate is treated for the separation and recovery of these separate compounds which may then be treated for the production and recovery of alumina and titanium dioxide with provision for regenerating and recycling sulfuric acid to the digestion stage.

Figure 2:
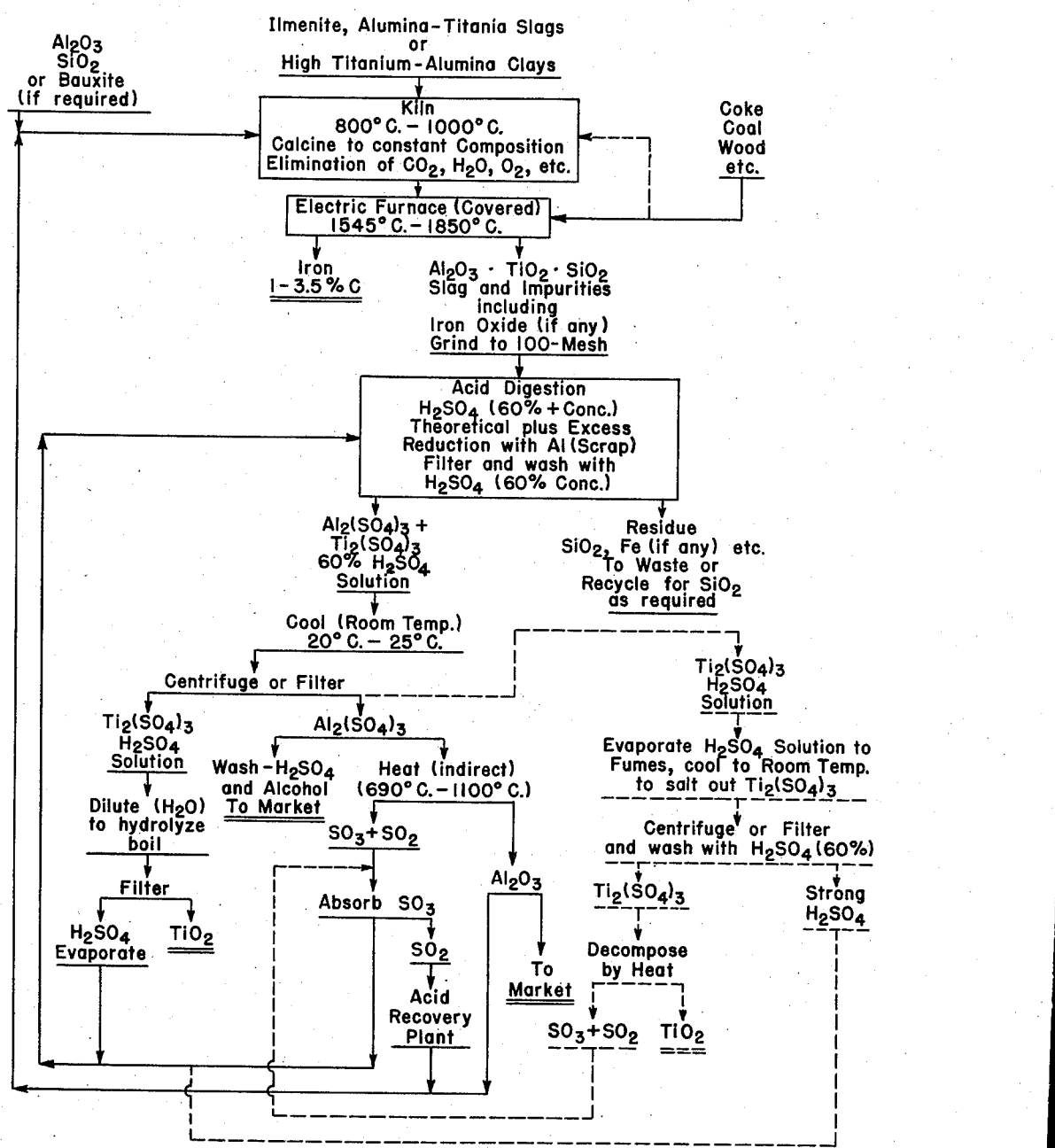
Figure 3:
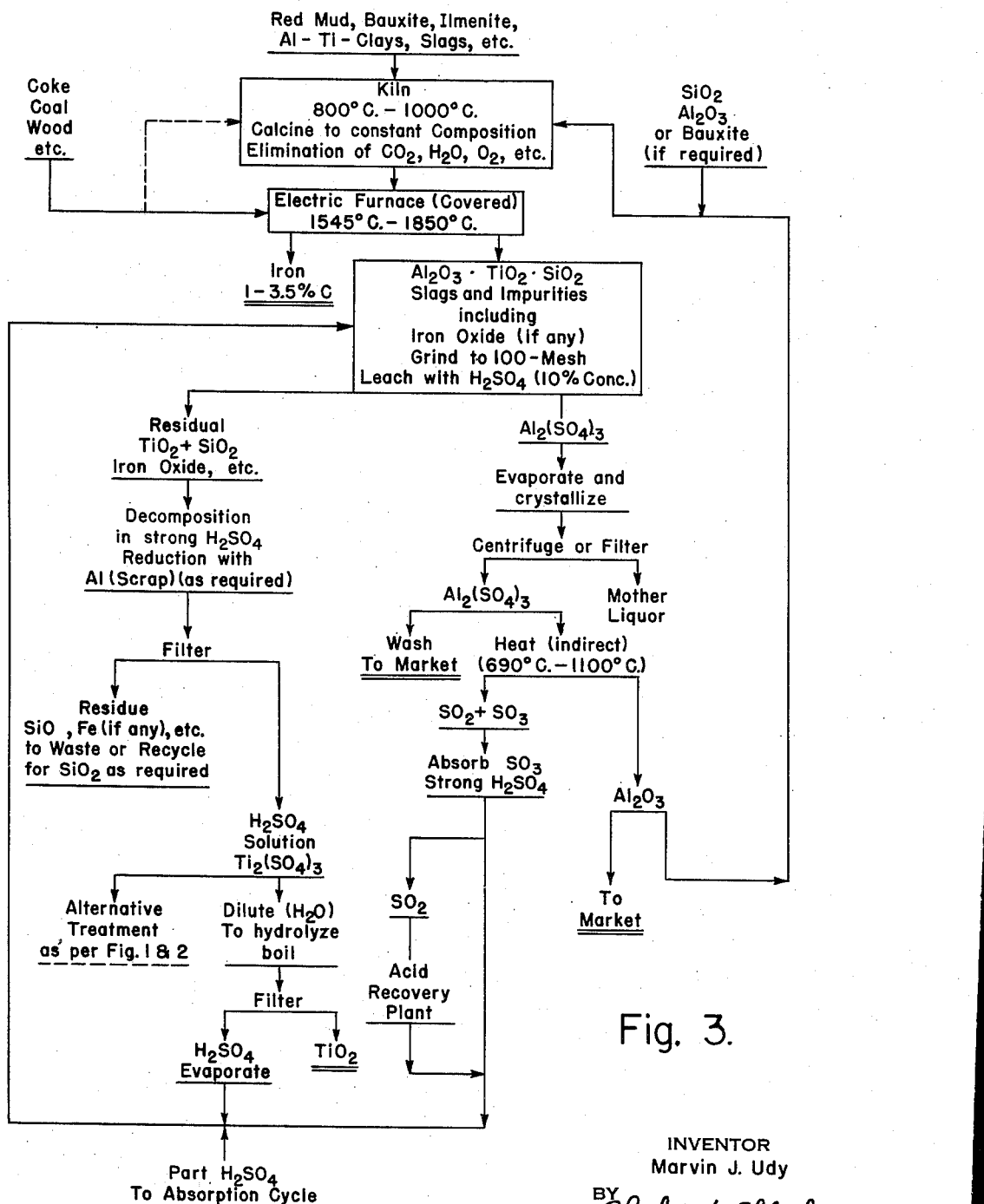

The principal features and objects of the invention as well as the exact process of the invention as applied to materials of the general class described will be best understood by reference to the following description and examples of specific embodiments thereof taken in conjunction with the accompanying drawings, wherein:

Fig. 1 is a schematic diagram or flow sheet of the process of the invention as applied to the treatment of high-iron bauxites or red mud waste residues from the Bayer alumina process with alternative process measures being indicated by dotted line representations;

Fig. 2 is a similar schematic diagram or flow sheet of the process of the invention as applied to the treatment of ilmenite ores, high-titanium-alumina clays and titania-alumina slags wherein alternative process measures are also shown in dotted flow lines; and Fig. 3 is a schematic diagram or flow sheet of a modified process of the invention in which a weak-acid leach is substituted for the strong-acid leach illustrated in the processes of Figs. 1 and 2.

With reference to the flow sheet of Fig. 1, in treating high-iron bauxites or red mud from the Bayer alumina process for the recovery of iron, alumina and titania according to the process of my invention, I first calcine the ore or residue in a rotary kiln or other suitable piece of equipment at a temperature within the range 800° C. to 1000° C. in order to stabilize it as to water, carbonates, etc., and to produce a substantially constant composition charge for the smelting stage. Thus, I have found that it is essential for subsequent selective reduction of iron in the smelting stage that the reduction charge to the furnace be stabilized to a substantially constant composition by removal of all water, the labile oxygen from $CO_2$, $H_2O$, etc., and such a preliminary treatment of charge material contributes greatly to the over-all efficiency of my process. I may calcine the ore or residue at temperatures as high as 1350° C. depending on the economics of a particular situation. For example, in the treatment of red mud residues I find that calcining at such higher temperatures results in the elimination of more soda from the residues, thereby effecting a savings in acid consumption in the subsequent acid decomposition treatment of slag recovered from the smelting stage.

In carrying out a process of the invention for smelting a charge comprising high-iron bauxite or red mud, the charge employed in the electric furnace for the removal of iron may consist essentially of the calcined material and a controlled amount of a carbonaceous reducing agent such as coal, cake, charcoal, wood, sawdust, etc. The reducing agent is employed in dry form, and the overall carbon content of the charge is adjusted to yield the amount of carbon desired in the metallic iron product recovered from the smelting stage. Impurities such as calcium oxide (CaO) and magnesium oxide (MgO), as well as the titania content of the ore or residue, tend to lower the melting point of the slags produced under actual operating conditions, and, accordingly, small additions of CaO or MgO are permissible, but the limits of addition of such compounds are governed entirely by the ultimate use for the slags produced. That is to say, if the slag is to be used for the recovery of titania and alumina, as per the present invention, the CaO and MgO additions, if any, should be held to a minimum for economic reasons. In treating high-iron bauxite ores and red mud residues, I prefer to avoid the addition of basic substances of this type by employing the alumina content of the ore or residue as a base with respect to silica present in the materials or added as such, since I have found that slags of the composition $Al_2O_3 \cdot TiO_2 \cdot SiO_2$ are excellent to work with for the removal of iron in the electric furnace and complete reduction and removal of the iron can be had at temperatures within the range 1545° C. to 1850° C. By suitably adjusting the silica-alumina ratios the smelting temperature can be controlled or varied for specific operations.

The components of the charge are so proportiond as to provide reducing agent in amount sufficient for the selective reduction to the metallic state of iron oxide present in the charge. An excess of carbonaceous reducing agent may be incorporated in the charge to the furnace and total reduction of iron effected with the simultaneous reduction, to a considerable extent, of the titanium dioxide content of the charge to lower oxides of titanium such as $Ti_2O_3$ and TiO, since, as pointed out hereinbefore, silica-alumina slags of the type produced in smelting bauxites and red mud residues, as well as ilmenite when smelted in accordance with a process of the invention, will hold substantial quantities of lower oxides of titanium in solution without becoming too refractory. Alternatively, I need not practice total reduction of the iron oxide in the smelting stage, but rather, if the dictates of a situation demand, some iron oxide can be left in the slag recovered from the electric furnace and reduced during acid decomposition of the slag, with scrap aluminum employed for reduction of titanium oxytrisulfate [$Ti_2O(SO_4)_3$] which is formed during the digestion treatment by reaction of titanium dioxide with sulfuric acid according to the following general equation:

(I) $\quad 2TiO_2 + 3H_2SO_4 \longrightarrow Ti_2O(SO_4)_3 + 3H_2O$
                                        Titanium
                                        Oxytrisulfate Of course, where complete or total reduction of iron is effected during smelting with reduction of titanium dioxide of the ore or residue to lower oxide forms of titanium, the foregoing reaction will proceed according to the general equations:

(II) $\quad Ti_2O_3 + 3H_2SO_4 \longrightarrow Ti_2(SO_4)_3 + 3H_2O$
                                        Titanous
                                        Sulfate and (III) $\quad TiO + H_2SO_4 \longrightarrow TiSO_4 + H_2O$
                                        Titanium
                                        Monosulfate and reduction of the oxysulfate with scrap aluminum is not necessary as it will not be formed during the acid digestion. For the most part, however, in actual practice for high-iron bauxites and red mud residues, I prefer to operate the electric furnace such that the greater portion of titanium dioxide present in the material is not reduced to lower oxide forms but remains in the dioxide form within the slag recovered from the furnace. In a similar manner, in accordance with a preferred process of the invention for the direct smelting of ilmenite ores (FeO.TiO$_2$), I prefer to operate the electric furnace for retention of some iron oxide and retention of the titanium values within the slag in the form of titanium dioxide.

The calcined material and carbonaceous reducing agent are charged to the electric furnace and smelted in accordance with the principles of my aforementioned copending application Serial No. 553,645, as explained hereinbefore, to produce metallic or elemental iron of carbon content within the range of one percent to three and one-half percent (1.0–3.5%), and a molten slag product containing alumina (Al$_2$O$_3$), titanium dioxide (TiO$_2$), silica (SiO$_2$), calcium oxide (CaO), magnesium oxide (MgO), etc. If necessary or desirable on continuous operations, the smelting furnace can be tapped intermittently into a holding furnace to effect settling and complete separation of metallic iron from the slag. The holding furnace can be operated simply to supply radiation losses, or, to supply power in excess of the power necessary to just meet radiation losses, thereby raising the temperature of the slag to effect complete melting of possible raw or only partially reduced charge material tapped from the primary furnace.

Following separation of the iron and slag, the slag is crushed in any suitable manner to approximately 100 mesh size and passed to suitable digestion tanks, wherein it is decomposed by digesting at boiling temperatures with sulfuric acid of at least sixty percent (60%) concentration. In order to facilitate filtering, I prefer to conduct the digestion operation at a temperature of at least 290° C. to dehydrate gelatinous silica. The sulfuric acid is employed in theoretical quantities plus about ten percent (10%) excess; the digestion proceeding according to the following equations:

(I) $\quad 2TiO_2 + 3H_2SO_4 \rightarrow Ti_2O(SO_4)_3 + 3H_2O$ and, (IV) $\quad Al_2O_3 + 3H_2SO_4 \rightarrow Al_2(SO_4)_3 + 3H_2SO_4$ Following complete digestion, the solution is filtered through any suitable filtering medium such as plastic fiber cloth, "Vinylon," "Orlon" or similar material, washed with sulfuric acid of approximately fifty-percent (50%) concentration, and thereafter washed with water. The solution containing oxytrisulfate of titanium and aluminum sulfate is reduced, as required, with metallic aluminum scrap to convert the titanium oxytrisulfate to the titanous sulfate form [Ti$_2$(SO$_4$)$_3$], and, of course, to effect reduction to the metallic state of any iron oxide carried in the slag from the smelting stage. The residue, largely silica, and containing impurities including any metallic iron reduced by the aluminum, is discarded. Thereafter, the filtered solution is evaporated to 60% H$_2$SO$_4$ and allowed to cool to room temperature (20° C.–25° C.), at which point the solubility of aluminum sulfate in 60% H$_2$SO$_4$ is very low, and the Al$_2$(SO$_4$)$_3$ crystallizes out and is recovered by filtering or centrifuging. The aluminum sulfate is washed with 60% H$_2$SO$_4$, and, if it is to be marketed as such, it is further washed with alcohol. Alternatively, it may be converted to alumina (Al$_2$O$_3$) by heating indirectly to a temperature of about 690° C. at which point decomposition takes place, but it should be dehydrated first at a somewhat lower temperature, and, I find that a finishing temperature within the range 1000° C. to 1100° C. will insure complete elimination of sulfur. The resulting sulfur oxides (SO$_2$+SO$_3$) are treated by absorbing the SO$_3$ in sulfuric acid and passing the SO$_2$ through an acid recovery plant, and thereafter, the regenerated acid is recycled to the digestion stage or a subsequent acid washing stage of the process.

The 60% sulfuric acid solution containing the titanous sulfate [Ti$_2$(SO$_4$)$_3$] is diluted with water and boiled and the sulfate hydrolyzed to yield titanium hydroxide [Ti(OH)$_3$], and the titanium hydroxide is then calcined to produce titanium dioxide which is allowed to settle and is then filtered and washed with water. The weak sulfuric acid remaining in solution is concentrated by evaporating and may be recycled to the process. Alternatively, as indicated by the dotted flow lines in Figs. 1 and 2 of the drawings, by evaporating the sulfuric acid solution to fumes, the Ti$_2$(SO$_4$)$_3$ can be crystallized or salted out and separated by filtering or centrifuging, and thereafter decomposed to titanium dioxide and SO$_2$+SO$_3$ with the bulk of the strong acid being regenerated and returned to the process.

With reference to the flow sheet of Fig. 2 of the drawings, it will be seen that the process of the invention as applied to the treatment of ilmenite ores, high-titanium-alumina clays, or high-alumina slags resulting from alumino-thermic reduction of ilmenite or rutile ores, is substantially the same as that described hereinbefore in connection with the treatment of high-iron bauxites and red mud residues, with the exception that I add silica and alumina to the kiln charge as required for the particular material under treatment. As applied to ilmenite (ferrous titanate—FeTiO$_3$ or FeO.TiO$_2$), the process provides for the production of separate marketable iron and titania products, with alumina as well as silica which are added to the basic ore in forming a furnace charge being recovered and recycled for use in smelting additional quantities of raw ore. Alternatively, I may employ bauxite ore for its alumina-silica content in forming a furnace charge with ilmenite, thereby recovering the alumina content of the bauxite for sale, and benefiting the titania and iron contents of the ilmenite with TiO$_2$ and iron present in the bauxite.

In present practice, titanium dioxide is ordinarily produced from ilmenite by digestion with concentrated sulfuric acid, dissolution of the cake with water, clarifiication of the solution of iron and titanium sulfates, crystallization of a portion of the iron as FeSO$_4$.7H$_2$O, precipitation of hydrated titanium dioxide by hydrolysis, and calcination to yield the oxide. Large-scale production of titanium dioxide by such a procedure leaves much to be desired inasmuch as approximately one-half of the acid is consumed by the iron in making FeSO$_4$ of little or no value, and the spent acid from the titania-hydrolysis step becomes a disposal problem.

It will be readily apparent, therefore, that the process of my invention as applied to ilmenite ores offers substantial advantages over conventional processes, in that, it provides for the recovery of a high percentage of the iron of the ore in the form of a commercially saleable product and eliminates the disposal problem attendant to the FeSO$_4$—H$_2$SO$_4$ residues formed in the conventional type of process. Furthermore, the process results in an economy in sulfuric acid consumption since there are little or no acid consuming materials present in the slags recovered from the smelting stage. Apart from relatively pure ilmenite ores and naturally occurring mixed ilmenite-rutile ores, the process is also equally applicable to ores of the magnetic type which have ferrous iron replaced by titanium such as the so-called "Tehawus" magnetite deposits of New York State. In point of fact, the silica-alumina content of this particular ore is such that it may be employed directly within a process of the invention without addition of these materials.

The process as illustrated in the flow sheet of Fig. 2 can also be adapted for use in the production of alumina from ordinary bauxite ores with recovery at the same time of silica present in the bauxite. The titanium dioxide recovered in such a modified process could be recycled as required in forming a charge for the smelting stage in place of ilmenite.

In the flow sheet of Fig. 3 of the drawings, I have shown the application of a weak-acid leaching technique to the process of the invention in which alumina of the slag can be recovered from solution within the weak-acid, while the titanium dioxide is recovered from the residue of the leaching stage by decomposition with strong acid.

The following are analyses of typical ores and residues that may be used in the process of the invention:

(I) RED MUD RESIDUE (REYNOLDS)

| | Percent |
|---|---|
| SiO$_2$ | 6.60 |
| Fe$_2$O$_3$ | 53.01=37.2% Fe |
| TiO$_2$ | 6.60 |
| Al$_2$O$_3$ | 14.88 |
| P$_2$O$_5$ | 1.37= 0.61% P |
| CaO | 0.77 |
| Na$_2$O | 2.05 |
| IGN. | 10.63 |
| Diff. | 5.09 |

(II) HIGH-IRON BAUXITE ORE

| | Percent |
|---|---|
| SiO$_2$ | 16.0 |
| Fe$_2$O$_3$ | 37.7 |
| Al$_2$O$_3$ | 39.4 |
| TiO$_2$ | 5.2 |
| CaO, Mg, etc. | 1.7 |

(III) ILMENITE ORE

| | Percent |
|---|---|
| TiO$_2$ | 49.32 |
| FeO | 27.81 |
| Fe$_2$O$_3$ | 9.13 |
| MgO | 8.68 |
| SiO$_2$ | 0.76 |
| Al$_2$O$_3$ | 2.84 |
| CaO | 0.23 |
| Diff. | 1.23 |

(IV) TEHAWUS MAGNETITE ORE

| | Percent |
|---|---|
| TiO$_2$ | 18.8 |
| Fe$_2$O$_3$ | 57.5 |
| Al$_2$O$_3$ | 7.5 |
| SiO$_2$ | 11.8 |
| MgO, CaO, etc. | 1.1 |
| Diff. | 3.3 |

The following examples illustrate the specific application of the foregoing principles and objects of the invention to the production of iron, alumina and titania from materials of the analyses set forth above:

*Example I.—Red mud*

A charge consisting of fifty (50) pounds of calcined red mud of the analysis set forth above under I, and seven (7) pounds of coke of eighty-four percent (84%) fixed carbon content, was smelted in an electric furnace operated according to the teachings of my copending application Serial Number 553,645, of even date, at a slag temperature within the range 1600° C.–1700° C., with the production and recovery of metallic iron of two percent (2.0%) carbon content and 0.001 percent titanium, representing better than ninety percent (90%) recovery, and a slag product of the following analysis:

| | Percent |
|---|---|
| Fe | 3.64 |
| SiO$_2$ | 19.30 |
| Al$_2$O$_3$ | 42.34 |
| TiO$_2$ | 15.30 |
| P$_2$O$_5$ | Trace |

One hundred grams (100 g.) of this slag in finely ground form was decomposed in two hundred grams (200 g.) of strong (60%) sulfuric acid at boiling temperatures (heated to dryness at 290° C.), to form Al$_2$(SO$_4$)$_3$, and Ti$_2$O(SO$_4$)$_3$. The dry, solid residue obtained from decomposition of the slag was ground and taken up in 800 cc. of sulfuric acid of sixty percent (60%) concentration, near the boiling temperature to maintain the solubility of Al$_2$(SO$_4$)$_3$, and in the presence of aluminum scrap metal to reduce the Ti$_2$O(SO$_4$)$_3$ to Ti$_2$(SO$_4$)$_3$.

The resulting solution was filtered through "Vinylon" cloth to separate it from the silica residue containing iron and other impurities.

The mother liquor was cooled to room temperature (25° C.), at which temperature Al$_2$(SO$_4$)$_3$ crystallized out with water of crystallization leaving a concentrated solution of H$_2$SO$_4$ containing Ti$_2$(SO$_4$)$_3$.

The Ti$_2$(SO$_4$)$_3$ solution was evaporated to fumes of H$_2$SO$_4$ and cooled to salt out the Ti$_2$(SO$_4$)$_3$ which was recovered by filtering.

The Al$_2$(SO$_4$)$_3$ recovered from solution was washed with concentrated sulfuric acid and, if it is to be sold as such it is also washed with alcohol. In this case, the aluminum sulfate was heated indirectly, initially at a temperature above 690° C. with finishing at 1000° C., to produce pure alumina and SO$_2$+SO$_3$. The mixed sulfur oxides were passed for absorption of the sulfur trioxide in sulfuric acid and the sulfur dioxide treated in a conventional acid recovery system for regeneration of sulfuric acid. The yield of alumina was better than ninety percent (90%).

The Ti$_2$(SO$_4$)$_3$ recovered from solution was diluted with water and hydrolyzed to titanium hydroxide Ti(OH)$_3$ which was then calcined for the production and recovery of titanium dioxide. The yield in this case was approximately ninety-three percent (93.0%).

*Example II.—Ilmenite*

A charge consisting of one hundred (100) pounds of calcined ilmenite ore of the analysis of III above, twenty-one (21) pounds of added alumina, and 8.24 pounds of coke of eighty-five percent (85%) fixed carbon content, was smelted in the same manner as the charge in Example I and at a temperature within the range 1600° C.–1700° C., to produce a metallic iron product of 1.5% carbon and 0.001 percent titanium, representing a yield of ninety-eight percent (98%), and molten slag which analyzed as follows:

| | Percent |
|---|---|
| TiO$_2$ | 59.54 |
| MgO | 10.47 |
| CaO | 0.27 |
| SiO$_2$ | 0.91 |
| Al$_2$O$_3$ | 28.78 |

The slag of the foregoing composition was decomposed and treated in the same manner as previously described in connection with Example I, with the recovery of titanium dioxide at a yield of better than ninety percent (90%), and alumina at a yield of ninety-two percent (92.0%).

As pointed out hereinbefore, in the treatment of this type of ore the alumina may be recycled to the smelting stage, or, bauxite ore may be added to the initial charge for its alumina content in lieu of pure alumina and the process operated for the recovery of both titania and alumina as commercial products.

*Example III.—Ilmenite*

The process of Example II was repeated with a charge consisting of one hundred (100) pounds of calcined ilmenite ore, eight (8) pounds of coke of eighty-five percent (85%) fixed carbon, and added silica in amount of 21.13 pounds. The metallic iron product recovered represented a yield in excess of ninety-five percent (95%), and the slag product recovered showed the following analysis:

| | Percent |
|---|---|
| $TiO_2$ | 60.0 |
| MgO | 10.55 |
| CaO | 0.27 |
| $Al_2O_3$ | 0.45 |
| $SiO_2$ | 25.70 |

This slag was decomposed in strong sulfuric acid in the same manner as for Example I, with titanium dioxide being recovered at a yield of approximately ninety percent (90%).

As will be readily apparent, the advantage attendant to the addition of silica to the furnace charge when smelting ilmenite, in lieu of alumina, is the economy realized in acid consumption since in the absence of any significant amount of alumina in the resulting slag recovered from the smelting stage, the only active acid consumer will be the titanium dioxide.

*Example IV.—High iron bauxite*

A charge consisting of one hundred (100) pounds of calcined high iron bauxite ore of the analysis of II above, and ten (10) pounds of coke of eighty-five percent (85%) fixed carbon was smelted at a temperature within the range 1580° C. to 1700° C. under conditions as described in my aforementioned copending application, with the production of metallic iron (98% yield) of 1.5% carbon and 0.001% titanium, and a slag of the following composition:

| | Percent |
|---|---|
| $Al_2O_3$ | 63.3 |
| $SiO_2$ | 25.62 |
| $TiO_2$ | 8.35 |
| CaO, MgO, FeO, etc. | 2.72 |

Upon digesting and treating the slag in accordance with the procedure described in Example I, alumina and titanium dioxide were recovered at yields in excess of ninety percent (90%) each.

*Example V.—Tehawus*

A charge consisting of one hundred (100) pounds of calcined Tehawus ore of the analysis of IV above, and 15.23 pounds of coke of eighty-five percent (85%) fixed carbon, was smelted as in the preceding examples, with the production of metallic iron of two percent (2.0%) carbon content and 0.001 percent titanium, representing better than ninety-six percent (96%) recovery, and a residual slag of the following composition:

| | Percent |
|---|---|
| $TiO_2$ | 48.1 |
| $Al_2O_3$ | 19.18 |
| $SiO_2$ | 29.92 |
| CaO, MgO, etc. | 2.81 |

In the acid digestion and subsequent treatment of the slag, alumina was recovered at a yield of ninety-two percent (92%), and titanium dioxide at a yield in excess of ninety-three percent (93%).

*Example VI.—Tehawus*

The process of Example V was repeated with an excess of coke (16.9 pounds of 85% fixed carbon) to effect total reduction of the iron oxide content of the Tehawus ore with reduction of the titanium dioxide to lower oxide forms of titanium. The recovery of iron (2.0% carbon) was substantially complete and the slag recovered from the smelting furnace analyzed as follows:

| | Percent |
|---|---|
| $Ti_2O_3$ | 45.32 |
| $Al_2O_3$ | 20.10 |
| MgO, CaO | 2.94 |
| $SiO_2$ | 31.62 |

The resulting acid decomposition was effected without reduction with metallic aluminum scrap, and alumina and titanium dioxide were recovered in excess of ninety percent (90%) yields.

Since it is considered obvious that many changes and modifications can be made in the foregoing methods and procedures without departing from the nature and spirit of my invention, it is to be understood that the invention is not to be limited to the specific details offered by way of illustration above, except as set forth in the following claims.

I claim:

1. A process for recovering iron, titanium and aluminum values from materials comprising iron oxide, titania, alumina and silica, that comprises, passing the material in the form of a charge into a covered electric furnace and onto the surface of a molten slag bath maintained therein, subjecting the charge to the action of a carbonaceous reducing agent within the furnace at an elevated temperature and utilizing the alumina and silica of the material as flux to effect reduction to the metallic state of substantially all of the iron oxide of the charge material with the production of molten metallic iron and a residual slag containing substantially all of the titania, alumina and silica of the original charge material, separating and recovering the metallic iron from the residual slag, decomposing the residual slag in aqueous sulfuric acid and recovering a solution of aluminum sulfate and titanium sulfate and a solid residue containing the silica of the original charge, separating and recovering the solution of sulfates from the solid residue, and treating the solution initially for the separation and recovery of aluminum sulfate and thereafter for the production and recovery of titanium dioxide.

2. The process as claimed in claim 1, wherein the titania contained in the residual slag from the electric furnace is in the form of titanium dioxide which reacts with sulfuric acid to form an oxysulfate of titanium during acid decomposition of the slag, and wherein the solution of aluminum sulfate and said oxysulfate of titanium resulting from the acid decomposition is reduced with metallic aluminum to convert the oxysulfate of titanium to titanium sulfate and to reduce to the metallic state any unreduced iron oxide present in the system.

3. The process as claimed in claim 1, wherein the titania contained in the original charge material is in the form of titanium dioxide and operation of the electric furnace is conducted to effect reduction of the titanium dioxide to lower oxides of titanium simultaneously with reduction of the iron oxide content of the charge material to metallic iron.

4. The process as claimed in claim 1, wherein the charge to the furnace comprises ilmenite ore ($FeTiO_2$) in admixture with added alumina and silica, and wherein aluminum sulfate recovered in the process is desulfurized by indirect heating at a temperature within the range 690° C.–1100° C. to produce alumina which is recycled to the electric furnace for use in smelting additional quantities of ilmenite ore.

5. The process as claimed in claim 4 wherein the silica residue resulting from acid decomposition of the slag is recycled to the electric furnace for use in smelting additional quantities of ilmenite ore.

6. The process as claimed in claim 1 and further comprising the step of treating the solution of aluminum sulfate and titanium sulfate formed during the acid decomposition with metallic aluminum scrap to effect the reduction to sulfate form of any oxysulfate present in solution, and to effect reduction to the metallic state of any unreduced iron oxide present in the system.

7. The process as claimed in claim 1 wherein the charge material comprises red mud residues resulting from alkaline extraction of bauxite ores in the production of alumina.

8. The process as claimed in claim 1 wherein the charge material comprises high-iron bauxite ore.

9. The process as claimed in claim 1 wherein the charge material comprises ilmenite ore (FeOTiO$_2$) in admixture with silica and alumina.

10. The process as claimed in claim 1 wherein the smelting temperature of the electric furnace is controlled within the range 1545° C.–1850° C. and reduction is effected by operating the furnace with the arcing tips of the furnace electrodes maintained between about one-half inch (½") from the upper surface of the molten slag bath therein to about three inches (3") below the upper surface of said molten slag bath.

11. The process as claimed in claim 1 wherein the smelting temperature of the electric furnace is controlled within the range 1545° C.–1850° C. and reduction is effected by (1) operating the furnace with the arcing tips of the furnace electrodes maintained between about one-half inch (½") from the upper surface of the molten slag bath therein and about three inches (3") below the upper surface of said molten slag bath, (2) maintaining a substantially constant resistance slag bath within the furnace by controlling the depth of molten slag, and (3) introducing charge material into the furnace and onto the surface of the molten slag bath therein at a rate in a direction of flow such as to avoid substantial submergence of the arcing tips of the electrodes within raw charge material.

12. The process as claimed in claim 1 wherein the charge material is calcined at a temperature within the range 800° C.–1350° C. to produce a substantially constant composition charge for reduction in the electric furnace.

13. The process for recovering iron, titania and alumina from materials comprising iron oxide, titania, alumina and silica, that comprises, passing the material in the form of a calcined, substantially constant composition charge into a covered electric furnace and onto the surface of a molten slag bath maintained therein, subjecting the charge to the action of a carbonaceous reducing agent within the furnace at an elevated temperature within the range 1545° C.–1850° C. and utilizing the alumina and silica of the material as flux to effect the selective reduction to the metallic state of substantially all of the iron oxide of the charge material with the production of molten metallic iron and a residual slag containing substantially all of the titania, alumina and silica of the original charge material, separating and recovering the metallic iron from the residual slag, decomposing the residual slag in aqueous sulfuric acid to produce a solution of aluminum sulfate and titanium sulfate and a solid waste residue, separating and recovering the solution of titanium sulfate and aluminum sulfate from the solid residue, treating the solution to precipitate aluminum sulfate therefrom, treating the resulting solution containing titanium sulfate for the production and recovery of titanium dioxide, and treating the aluminum sulfate by indirect heating at a temperature within the range 690° C.–1100° C. for the production and recovery of alumina.

14. The process for recovering iron, titania and alumina from materials comprising iron oxide, titania, alumina and silica, that comprises, passing the material in the form of a calcined, substantially constant composition charge into a covered electric furnace and onto the surface of a molten slag bath maintained therein, subjecting the charge to the action of a carbonaceous reducing agent within the furnace at an elevated temperature within the range 1545° C.–1850° C. and utilizing the alumina content of the material as a basic flux with respect to the silica content thereof to effect the selective reduction to the metallic state of substantially all of the iron oxide of the charge material with the production of molten metallic iron and a residual slag containing substantially all of the titania, alumina and silica of the original charge material, separating and recovering the metallic iron from the residual slag, decomposing the residual slag in aqueous sulfuric acid to produce a solution of aluminum sulfate and titanium sulfate and a solid waste residue, subjecting the solution to a reducing treatment with metallic aluminum scrap to effect the reduction to titanium sulfate [Ti$_2$(SO$_4$)$_3$] of any oxytrisulfate of titanum [Ti$_2$O(SO$_4$)$_3$] present therein and to effect reduction to the metallic state of any unreduced iron oxide present in the system, separating and recovering the solution of aluminum sulfate and titanium sulfate from the solid residue, treating the solution to precipitate aluminum sulfate therefrom, treating the resulting solution of titanium sulfate for the production and recovery of titanium dioxide, and treating the aluminum sulfate by indirect heating at a temperature within the range 690° C.–1100° C. for the production and recovery of alumina.

15. A process for recovering iron, titanium and aluminum values from materials comprising iron oxide, titania, alumina and silica, that comprises, subjecting the material to a reducing treatment in an electric furnace in the presence of a carbonaceous reducing agent utilizing the silica and alumina as flux to effect the reduction to the metallic state of substantially all of the iron oxide present therein with the production and recovery of metallic iron and a residual slag containing substantially all of the titania, alumina, and silica of the material, decomposing the residual slag in aqueous sulfuric acid and recovering a solution of aluminum sulfate and titanium sulfate and a solid residue containing the silica of the material, subjecting the solution to a reducing treatment with metallic aluminum scrap to effect the reduction to titanium sulfate [Ti$_2$(SO$_4$)$_3$] of any oxytrisulfate of titanium [Ti$_2$O(SO$_4$)$_3$] present therein and to effect reduction to the metallic state of any unreduced iron oxide present in the system, separating and recovering the solution of aluminum sulfate and titanium sulfate from the solid residue, and treating the sulfate solution initially for the separation of aluminum sulfate and thereafter for the production and recovery of titanium dioxide.

16. A process for recovering iron, titanium and aluminum values from materials comprising iron oxide, titanium dioxide, alumina and silica, that comprises, passing the material in the form of a charge into a covered electric furnace operated with combined arc-resistance, slag-resistance heating and onto the surface of a molten slag bath maintained therein, subjecting the charge to the action of a carbonaceous reducing agent within the furnace at a temperature within the range 1545° C.–1850° C. and utilizing the alumina of the material as a basic flux with respect to the silica therein to effect reduction to the metallic state of substantially all of the iron oxide of the charge material and reduction of the titanium dioxide of the material to lower oxides of titanium, with the production of molten metallic iron and a residual slag containing alumina and silica of the charge material together with the lower oxides of titanium resulting from reduction of the titanium dioxide, separating and recovering the metallic iron from the residual slag, digesting the residual slag in aqueous sulfuric acid and recovering a solution of aluminum sulfate and titanium sulfate and a solid residue containing the silica of the original material, separating and recovering the solution of aluminum sulfate and titanium sulfate from the solid residue, and treating the solution initially for the separation and recovery of aluminum sulfate and thereafter for the production and recovery of titanium dioxide.

17. The process as claimed in claim 16 and further comprising the step of reducing the solution of aluminum sulfate and titanium sulfate produced during acid digestion with aluminum scrap metal to effect the reduction to titanium sulfate [$Ti_2(SO_4)_3$] of any oxytrisulfate of titanium [$Ti_2O(SO_4)_3$] present therein by reason of incomplete reduction of titanium dioxide to lower oxide forms of titanium in the electric furnace, and to effect reduction to the metallic state of any iron oxide present in the system by reason of mechanical contamination and incomplete reduction within the electric furnace.

18. A process for recovering iron, titanium and aluminum values from materials comprising iron oxide, titanium dioxide, alumina and silica, that comprises passing the material in the form of a calcined, substantially constant composition charge into a covered electric furnace and onto the surface of a molten slag bath maintained therein, subjecting the charge to the action of a carbonaceous reducing agent within the furnace at an elevated temperature within the range 1545° C.–1850° C. and utilizing the alumina and silica of the material as flux with the alumina functioning as a base with respect to silica to effect the selective reduction to the metallic state of a substantial portion of the iron oxide of the charge material, without reducing any substantial portion of the titanium dioxide of the charge material to lower oxides of titanium, and with the production of molten metallic iron and a residual slag containing substantially all of the alumina, silica, titanium dioxide and unreduced iron oxide of the charge material, separating the metallic iron from the residual slag, digesting the slag in ground form with aqueous sulfuric acid of at least sixty percent concentration at an elevated temperature to produce a solution of aluminum sulfate and titanium oxytrisulfate and a solid residue containing the silica of the original charge, reducing the solution of aluminum sulfate and titanium oxytrisulfate with metallic aluminum scrap to convert the titanium oxytrisulfate to titanium sulfate and to effect the reduction to metallic iron of unreduced iron oxide carried in the slag from the electric furnace, separating the solution of aluminum sulfate and titanium sulfate from the solid residue, and treating the solution initially for the separation and recovery of aluminum sulfate and thereafter for the production and recovery of titanium dioxide.

19. A process for recovering iron, titanium and aluminum values from materials comprising iron oxide, titania, alumina and silica, that comprises, passing the material in the form of a charge into a covered electric furnace and onto the surface of a molten slag bath maintained therein, subjecting the charge to the action of a carbonaceous reducing agent within the furnace at an elevated temperature utilizing alumina of the material as a basic flux with respect to silica therein to effect reduction to the metallic state of substantially all of the iron oxide of the charge material with the production of molten metallic iron and a residual slag containing substantially all of the titania, alumina and silica of the original charge material, separating and recovering the metallic iron from the residual slag, decomposing the residual slag in ground form within a weak aqueous solution of sulfuric acid to form a solution of aluminum sulfate and a solid residue containing the titania and silica of the original charge material, treating the aluminum sulfate solution for the production and recovery of aluminum sulfate, decomposing the solid residue in a strong aqueous solution of sulfuric acid to form a solution of titanium sulfate and a solid waste residue containing the silica of the original material, and treating the solution of titanium sulfate for the production and recovery of titanium dioxide.

20. A process for recovering iron from materials comprising iron oxide, titania, alumina and silica that comprises, passing the material in the form of a charge into a covered electric furnace and onto the surface of a molten slag bath maintained therein, subjecting the charge to the action of a carbonaceous reducing agent within the furnace at an elevated temperature and utilizing the alumina of the material as a base with respect to silica therein to effect reduction to the metallic state of substantially all of the iron oxide of the charge material with the production of molten metallic iron and a residual acid slag containing substantially all of the titania, alumina and silica of the original charge material, and separating and recovering the metallic iron from the residual slag.

21. A process for separating iron from titanium and aluminum values within materials comprising iron oxide, titania, alumina and silica that comprises, passing the material in the form of a charge into a covered electric furnace and onto the surface of a molten slag bath maintained therein, subjecting the charge to the action of a carbonaceous reducing agent within the furnace at an elevated temperature and utilizing the alumina of the material as a base with respect to silica therein to effect reduction to the metallic state of substantially all of the iron oxide of the charge material with the production of molten metallic iron and a residual acid slag containing substantially all of the titania, alumina and silica of the original charge material, and separating and recovering the metallic iron from the residual slag.

References Cited in the file of this patent

UNITED STATES PATENTS

| | | |
|---|---|---|
| 2,290,112 | Merriam et al. | July 14, 1942 |
| 2,290,113 | Bousquet et al. | July 14, 1942 |
| 2,537,229 | McLaren | Jan. 9, 1951 |

OTHER REFERENCES

"The Aluminum Industry" (Edwards et al.), vol. 1, publ. by McGraw-Hill Book Co., Inc. (1930). Pages 205 and 214 relied on.)

UNITED STATES PATENT OFFICE

CERTIFICATE OF CORRECTION

Patent No. 2,830,892                                                  April 15, 1958

Marvin J. Udy

It is hereby certified that error appears in the printed specification of the above numbered patent requiring correction and that the said Letters Patent should read as corrected below.

Column 2, line 8, for "alumiate" read -- aluminate --; column 6, line 25, for "cake" read -- coke --; column 13, line 43, after "rate" insert -- and --.

Signed and sealed this 29th day of July 1958.

(SEAL)
Attest:

KARL H. AXLINE
Attesting Officer

ROBERT C. WATSON
Commissioner of Patents